(12) United States Patent
Lay

(10) Patent No.: US 7,617,925 B2
(45) Date of Patent: Nov. 17, 2009

(54) CONVEYOR IDLER SUPPORT FRAME

(75) Inventor: Michael Lay, Warriewood (AU)

(73) Assignee: Smart Frame Technology Pty Ltd., Bowral (AU)

( * ) Notice: Subject to any disclaimer, the term of this patent is extended or adjusted under 35 U.S.C. 154(b) by 56 days.

(21) Appl. No.: 11/910,085

(22) PCT Filed: Mar. 23, 2006

(86) PCT No.: PCT/AU2006/000389

§ 371 (c)(1),
(2), (4) Date: Feb. 21, 2008

(87) PCT Pub. No.: WO2006/102699

PCT Pub. Date: Oct. 5, 2006

(65) Prior Publication Data

US 2008/0190740 A1 Aug. 14, 2008

(30) Foreign Application Priority Data

Mar. 31, 2005 (AU) .............................. 2005901549

(51) Int. Cl.
*B65G 21/00* (2006.01)
*B65G 15/08* (2006.01)
*B65G 39/12* (2006.01)

(52) U.S. Cl. .................. 198/828; 198/830; 198/842
(58) Field of Classification Search ................ 198/828, 198/830, 842
See application file for complete search history.

(56) References Cited

U.S. PATENT DOCUMENTS

| | | | | |
|---|---|---|---|---|
| 3,191,761 A * | 6/1965 | Reilly | ......................... | 198/828 |
| 3,643,793 A * | 2/1972 | Diantonio | .................... | 198/828 |
| 5,657,857 A * | 8/1997 | Neilson et al. | ........... | 198/861.1 |
| 5,988,361 A | 11/1999 | Giacomin et al. | | |
| 6,942,085 B1 * | 9/2005 | Tatz | ......................... | 193/35 R |
| 2004/0079621 A1 * | 4/2004 | Mott | .......................... | 198/823 |

* cited by examiner

*Primary Examiner*—Mark A Deuble
(74) *Attorney, Agent, or Firm*—Darby & Darby PC

(57) ABSTRACT

A conveyor idler support frame (10) for rotatably mounting a conveyor idler (12, 14, 16, 20, 22) is provided. The frame is displaceable between an operation position and an idler removal position. In the operation position, the frame places a mounted idler in operational engagement with a conveyor belt (18). In the idler removal position, the frame brings the mounted idler out of engagement with the conveyor belt to allow the idler to be removed from the frame.

15 Claims, 2 Drawing Sheets

CONVEYOR IDLER SUPPORT FRAME

CROSS REFERENCE TO RELATED APPLICATIONS

This is a U.S. National Phase application under 35 U.S.C. §371 of International Application No. PCT/AU2006/000389, filed Mar. 23, 2006 and claims the benefit of Australian Patent Application No. 2005901549, filed on Mar. 31, 2005. The International Application was published Oct. 5, 2006 as WO 2006/102699 under PCT Article 21 (2).

FIELD OF THE INVENTION

The present invention relates to conveyor systems for handling bulk materials and, in particular, relates to support structures and frames for mounting conveyor idlers which are used to support conveyor belts.

BACKGROUND OF THE INVENTION

The present invention is principally concerned with the removal and/or replacement of conveyor idlers (or rollers) from a conveyor system. An idler is typically a cylindrical shaped component that rotates on a fixed central shaft, the central shaft being mounted on a frame structure. In order to minimize friction, an idler would rotate on the central shaft by way of bearings. In practice, a frame structure would support and mount a number of idlers. For example, a frame structure may include three carry (or top) idlers, which support the conveyor belt on its forward path, and one or more return (or bottom) idlers underneath the carry idlers which support the conveyor belt on its return path. A typical conveyor system would have frame structures positioned along the length of the conveyor at intervals of between 1.5 m to 3 m.

Idlers have a limited life due to two main fail conditions, the first being bearing failure by way of collapsing or seizing and the second being wear on the shell of the idler producing holes in the idler shell walls. Continued use of a failed idler can prove hazardous to the conveyor belt itself. In the case of a seized bearing, the belt would be moving over a stationary idler producing friction and resulting in local heating to the belt. This condition has been known to cause ignition of the conveyor belt and/or the material being carried on the belt.

To avoid such problems, a failed idler needs to be removed and replaced. To replace an idler, the conveyor belt firstly needs to be stopped and electrically isolated. The belt is required to be physically lifted to remove downward pressure on the idler to allow the idler to be accessed and removed from its frame. It will be appreciated that the need to stop the conveyor causes significant interruptions to production and adds costs for industrial users. The process of lifting the belt requires the use of lifting equipment. Furthermore, lifting the belt adds tension to the belt which creates a hazardous working environment for personnel accessing the idlers. A weakened belt may snap under increased tension and cause injury to personnel.

Accordingly, it is an object of the present invention to provide an improved process and means for removing and replacing conveyor idlers which minimises or avoids interruptions to the running of the conveyor, and which does not require the lifting of the conveyor belt.

SUMMARY OF THE INVENTION

According to the invention there is provided a conveyor idler support structure, said structure including:

a support frame for rotatably mounting a conveyor idler, said frame being displaceable between an operation position and an idler removal position; wherein, in said operation position, said frame places a mounted idler in operational engagement with a conveyor belt; and wherein, in said idler removal position, said frame brings said mounted idler out of engagement with said conveyor belt to allow said idler to be removed from said frame; and a idler cradle arranged with respect to said support frame such that, as said support frame is displaced from said operation position to said idler removal position, said idler cradle engages said mounted idler and demounts said idler from said support frame.

The frame is preferably pivoted between said operation position and said idler removal position. The frame can include a cam mechanism for laterally displacing the frame during pivoting. In a preferred form, a removable lever located at the side of a conveyor belt allows the frame to be manually displaced and a locking mechanism allows the frame to be locked into a selected position.

Preferably, the frame includes a pivotal shaft and idler support arms extending from said pivotal shaft, each arm having a hook and slot arrangement for receiving and rotatably mounting an idler shaft on opposing sides of said idler.

Preferably, the structure includes an access passage arranged between said idler cradle and a side of said conveyor to allow a demounted idler to be removed from said idler cradle and/or load a replacement idler onto said idler cradle.

The inventive arrangement advantageously allows the removal and replacement of conveyor idlers without necessarily requiring the running of a conveyor to be stopped. The inventive arrangement does not require the lifting of a conveyor belt and facilitates a safer working environment for personnel.

BRIEF DESCRIPTION OF THE DRAWINGS

A preferred embodiment of the present invention will now be described with reference to the accompanying drawings, in which.

DESCRIPTION OF PREFERRED EMBODIMENT

Figure 1:
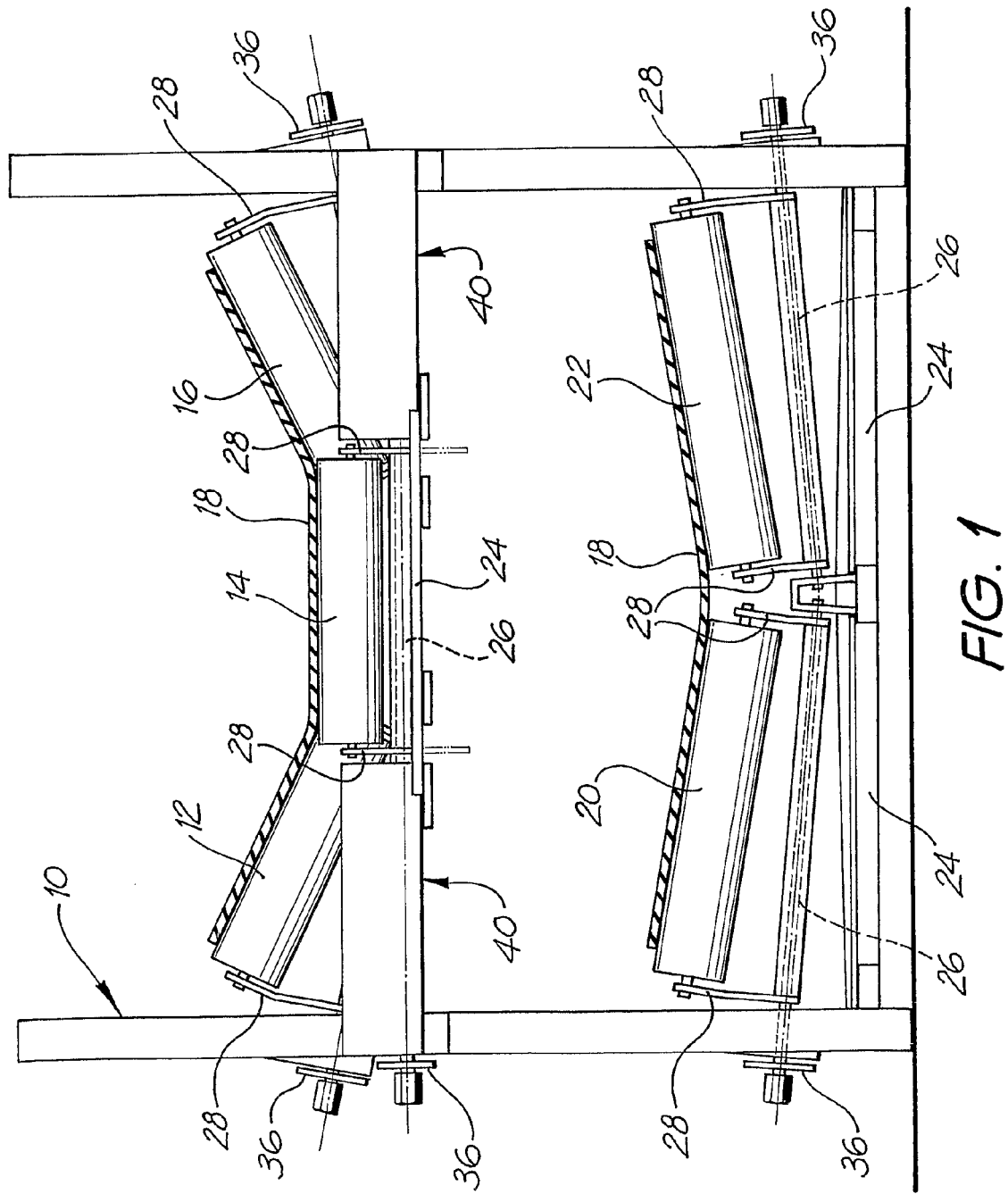
FIG. 1 is a front view of a preferred embodiment of a conveyor idler support structure.

FIG. 1 shows a preferred form of a conveyor idler support structure 10. This structure includes five idlers: three carry (or top) idlers 12, 14, 16, supporting the conveyor belt 18 on its forward path, and two return (or bottom) idlers 20, 22, supporting the conveyor belt 18 on its return path. Each idler is rotatably mounted on its own support frame. The structure also includes five idler cradles 24. Each cradle 24 extends horizontally from said structure 10 and is positioned below a respective frame.

Figure 3:
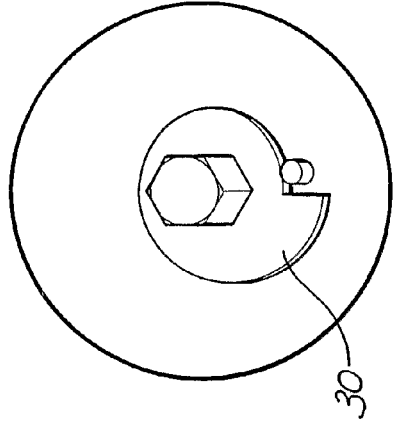
FIG. 3 is view of the cam mechanism.

Each support frame is made up of a shaft 26, extending to a side of the support structure 10 and a pair of arms 28, extending from the shaft 26. The shaft 26 is arranged so that it can be rotated from the side of the support structure 10 by way of a lever (not shown) and cam mechanism 30. The lever is arranged to be removable so that it can be used on any support frame shaft. Rotating the shaft 26 causes the support frame to pivot about an axis defined by the shaft length. The cam mechanism 30, as shown in FIG. 3, causes the support frame to laterally displace while the frame is being pivoted.

In practical field tests, it has been found that the lateral displacement caused by a cam mechanism 30 is not necessarily required. Therefore, in alternative preferred embodiments a cam mechanism is not provided and movement of the support frame by rotating the shaft 26 is purely pivotal.

Figure 4:
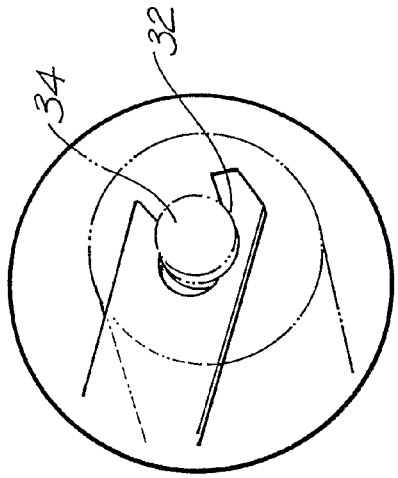
FIG. 4 is a view of the mounting arrangement on an arm of the support frame.

Each arm 28 includes a hook and slot arrangement 32 for engaging a slot on a central shaft 34 of an idler, as shown in FIG. 4. This arrangement allows for the mounting and demounting of an idler from the frame, as explained later.

In FIG. 1 all of the idler frames are shown in an operation position. In other words, each frame is in a position where the arms 28 are vertical, the idlers are mounted in the slots of the arms 28 and the idlers are in operational engagement with the conveyor belt 18.

In order to remove an idler, the lever is used to turn the shaft 26 of the respective support frame causing the frame, and hence the idler, to pivot away from its operation position. If present, the cam mechanism 30 also causes the idler to move downwards away from the belt 18 which assists the pivoting action by lessening the pressure from the belt on the idler.

A lock mechanism (not shown) associated with the shaft 26 of each support frame allows a support frame to be retained in its operation position. It will be apparent that the locking mechanism needs to be disabled before the lever can be used to turn the shaft 26 of a support frame.

The lock mechanism can take a number of suitable forms. One preferred form includes providing a flange 36 extending from the shaft of a support frame adjacent the side of the support structure 10. The flange 36 includes a hole 20 which, in the operation position, coincides with a hole in the side of the support structure 10. Thus a pin or screw can be inserted through the hole in the flange 36 into the hole in the support structure 10 to retain the shaft 26 in the operation position. Alternatively, the flange 36 may include a spring-loaded pin which engages the hole in the support structure 10 when the flange 36 is in the operation position. In will be appreciated that other forms of locking mechanisms could be employed, including ones which would allow the support frame to be locked into any selected position.

Figure 2:
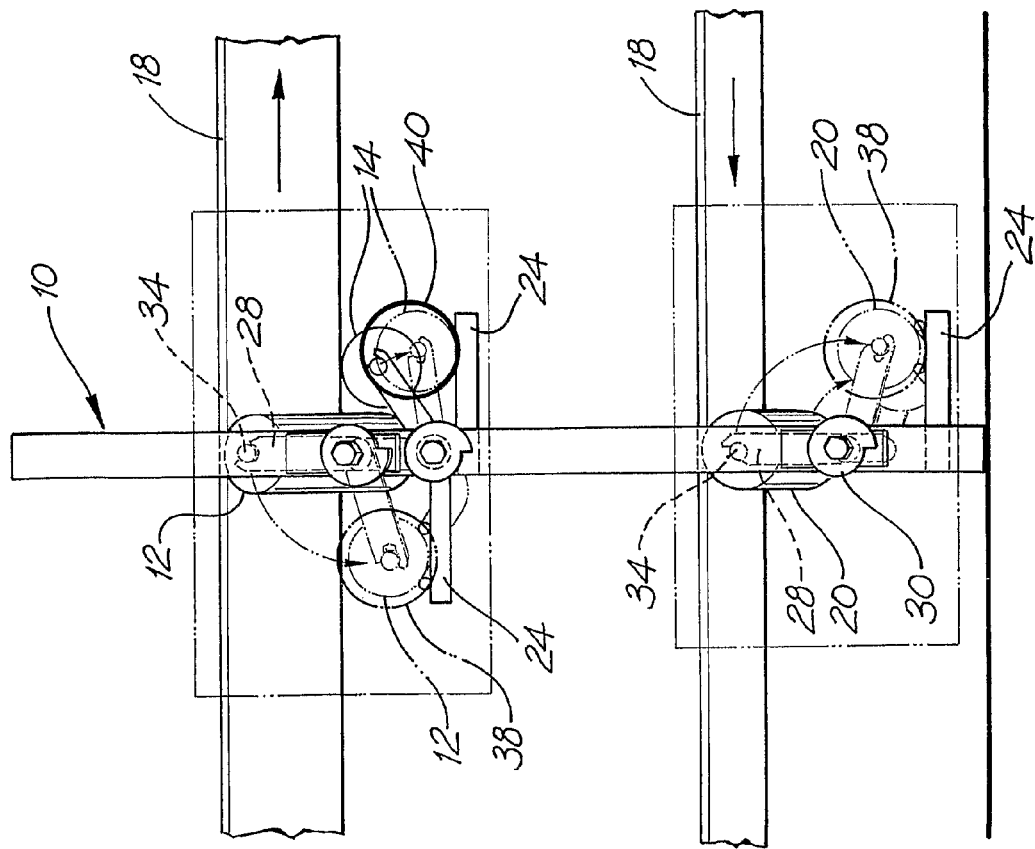
FIG. 2 is a side view of the structure of FIG. 1 showing the different positions for the idler support frames.

In FIG. 2, there is shown the various support frames pivoting from the operation position to an idler removal position. As the support frame is pivoted past 90° from the vertical, operation position, gravity moves the idler along the slot in the arm 28 of the support frame to the hook portion. Furthermore, the idler is captured by the respective cradle 24. Hence, as the frame is pivoted further, the idler demounts from the support frame via the hook portion. The idler can then be removed from the cradle 24 from the side of the structure 10. A replacement idler can then be placed on the cradle 24, mounted on the support frame and brought to the operation position by pivoting the support frame in the opposite direction.

Ideally, a safety barrier is arranged at the side of the structure 10 to prevent personnel from getting past the side of the structure 10 to a position under the conveyor belt 18. Where a safety barrier is used, the barrier will include access portions 38 associated with the cradles to allow idlers to be removed from and loaded onto the cradle 24 from the side of the structure 10. In the case of idlers 12, 16, 20, 22 located at the side of the conveyor, the access portion 38 may simply be a hole in the barrier. In the case of a central idler 14, for example the central carry idler 14 in FIG. 1, further means are required to safely remove the idler 14 from and load a replacement idler onto the respective cradle 24. As shown in FIG. 1, access tubes 40 are arranged on either side of and in alignment with the cradle 24 associated with the central idler 14. When the support frame of the central idler 14 is in the idler removal position and the central idler 14 is demounted and captured on the cradle 24, a replacement idler is loaded from the side of the structure 10 via an access tube 40. As the replacement idler is pushed through the access tube 40 it, in turn, pushes the central idler 14 into the opposing access tube 40 and replaces the central idler 14 on the cradle 24. The replaced central idler 14 can then be accessed and removed from the opposing access tube 40.

As with typical conveyor systems, the system would include a number of the described support structures 10 arranged along its length, spaced apart by 1.5 m to 3 m. Normally, only one idler of the plurality of idlers on a support structure 10 would need to be replaced at a time. It has been found that the replacement of one idler, using the support frame and structure 10 described, can be conducted whilst maintaining the running of the conveyor belt 18. Conveyor belts run under tension. During replacement of an idler, sufficient support for the belt 18 is provided by the other idlers on the support structure 10 and the idlers on adjacent support structures until the replacement idler is its operation position.

While the present invention has been described with reference to a specific preferred embodiment, it will be apparent that various modifications and changes could be made to this embodiment without departing from the scope of the invention as hereinafter claimed.

The invention claimed is:

1. A conveyor idler support structure, said structure comprising:

a support frame for rotatably mounting a conveyor idler, said frame being displaceable between an operation position and an idler removal position about a pivotal axis;

wherein, in said operation position, said frame places said mounted idler in operational engagement with a conveyor belt; and wherein, in said idler removal position, said frame brings said mounted idler out of engagement with said conveyor belt to allow said idler to be removed from said frame, said frame comprising a pivotal shaft arranged along said pivotal axis and idler support arms extending from said pivotal shaft, said idler support arms arranged to receive and rotatably mount opposing ends of an idler shaft of said idler, each of said idler support arms comprising a recess for receiving and rotatably mounting said idler shaft; and an idler cradle arranged with respect to said support frame such that, as said support frame is displaced from said operation position to said idler removal position, wherein said mounted idler engages and rests upon said idler cradle, and further displacement of said support frame causes said idler shaft to demount from said recess in each of said idler support arms and demounts said idler from said support frame while said idler remains upon said idler cradle.

2. The conveyor idler support structure according to claim 1, said frame further comprising a cam mechanism for providing lateral displacement of said frame as said frame is pivoted between said operation position and said idler removal position.

3. The conveyor idler support structure according to claim 1, wherein said recess in each of idler support arms comprises a hook and slot arrangement for receiving and rotatable mounting said idler shaft.

4. The conveyor idler support structure according to claim 1, further comprising a locking mechanism for releasably locking said frame in a selected position.

5. The conveyor idler support structure according to claim 1, said structure further comprising an access passage arranged between said idler cradle and a side of said conveyor to allow a demounted idler to be removed from said idler cradle and/or load a replacement idler onto said idler cradle.

6. The conveyor idler support structure according to claim 1, said structure comprising a plurality of support frames for rotatably mounting a respective number of idlers.

7. The conveyor idler support structure according to claim 6, wherein each support frame is displaceable independently with respect to each other.

8. A conveyor system comprising at least one conveyor idler support structure according to claim 1.

9. A method for removing a conveyor idler from a conveyor system, said method comprising the steps of:
  displacing an idler support frame with idler support arms, on which an idler is rotatably mounted, from an operation position, in which said mounted idler is in operational engagement with a conveyor belt, to an idler removal position, in which said mounted idler is out of engagement with said conveyor belt, each of said idler support arms comprising a recess for receiving and rotatably mounting an idler shaft of said idler;
  wherein, during said displacement, said mounted idler engages and rests upon an idler cradle, and wherein further displacement of said support frame causes said idler shaft to demount from said recess in each of said support arms and causes said idler to be demounted from said support frame while remaining upon said idler cradle; and
  removing said demounted idler from said idler cradle.

10. The method according to claim 9, wherein said step of displacing comprises pivoting said support frame.

11. The method according to claim 10, further comprising laterally displacing said frame during pivoting by way of a cam mechanism.

12. The method according to claim 9, wherein said displacing step is caused by applying manual force.

13. The method according to claim 9, further comprising the initial step of unlocking said support frame to allow said frame to be displaced.

14. The method according to claim 9, further comprising the steps of:
  providing a replacement idler;
  positioning said replacement idler on said idler cradle; and
  displacing said support frame to said operation position, during which said recess in each of said support arms engages an idler shaft of said replacement idler to mount said replacement idler onto said support frame.

15. The method according to claim 14, further comprising the step of locking said support frame in said operation position.

* * * * *